United States Patent [19]

Strauff

[11] 4,123,964
[45] Nov. 7, 1978

[54] PRESSURE CONTROL MEANS FOR DISTRIBUTION OF MEDIUM FROM A RESERVOIR OR STORAGE VESSEL

[75] Inventor: Gunther Strauff, Kaarst, Fed. Rep. of Germany

[73] Assignee: Langen & Co., Dusseldorf, Fed. Rep. of Germany

[21] Appl. No.: 669,093

[22] Filed: Mar. 22, 1976

Related U.S. Application Data

[62] Division of Ser. No. 425,549, Dec. 17, 1973, abandoned.

[30] Foreign Application Priority Data

Dec. 18, 1972 [DE] Fed. Rep. of Germany ....... 2261872

[51] Int. Cl.² ............................................ F15B 13/14
[52] U.S. Cl. ....................... 91/434; 91/441; 91/465
[58] Field of Search ................. 91/370, 371, 372, 373, 91/374, 375 R, 375 A, 431, 434, 436, 464, 465, 452, 32, 391 R, 441

[56] References Cited

U.S. PATENT DOCUMENTS

| | | | |
|---|---|---|---|
| 2,624,321 | 1/1953 | Levetus | 91/464 |
| 2,904,957 | 9/1959 | Quayle | 91/441 |
| 2,930,357 | 3/1960 | Brueder | 91/465 |
| 3,436,915 | 4/1969 | Mercier | 91/464 |
| 3,460,440 | 8/1969 | Brent | 91/464 |
| 3,553,966 | 1/1971 | Liebert | 91/374 |
| 3,698,415 | 10/1972 | Forster | 91/434 |
| 3,855,904 | 12/1974 | Jablonsky | 91/372 |
| 3,922,953 | 12/1975 | Strauff | 91/371 |

FOREIGN PATENT DOCUMENTS 1,650,352 9/1970 Fed. Rep. of Germany.

*Primary Examiner*—Martin P. Schwadron
*Assistant Examiner*—Abraham Hershkovitz
*Attorney, Agent, or Firm*—Holman & Stern

[57] ABSTRACT

A pressure medium control means for hydraulic servo-steering devices with a pressure source and preferably a hydraulic pressure accumulator in which means there is provided a control valve having a four-way control and one or preferably two control pistons for selectively connecting the working spaces of a servo motor with a pressure source or return pipe to a reservoir, in which the servo motor is operably related to a power outlet member affecting the steerable wheels, with the power outlet member per se being connected with a power inlet member via a resilient, preferably pre-stressed coupling means, and in which the control piston or pistons is or are provided with reaction areas stressed by the pressures from the working spaces of the servo motor, or are in operative relation with respective reaction members and are actuable via actuating elements by virtue of relative movements between the power inlet member and the power outlet member.

2 Claims, 3 Drawing Figures

Fig. 1

PRESSURE CONTROL MEANS FOR DISTRIBUTION OF MEDIUM FROM A RESERVOIR OR STORAGE VESSEL

This is a divisional of application Ser. No. 425,549 filed Dec. 17, 1973 and now abandoned.

BACKGROUND OF THE INVENTION

This invention relates to a pressure medium control means for hydraulic servo-steering devices provided with a pressure source and preferably a hydraulic pressure accumulator in which means there is included a control valve having a four-way control and one or preferably two control pistons for selectively connecting the working spaces of a servo motor with a pressure source or return line to a reservoir.

More particularly, the servo motor is in operative relationship with a power output member which affects the steerable wheels, with the power output member being connected with a power input member via elastic, preferably pre-stressed coupling means, and in which the control pistons are provided with reaction areas stressed by the pressures of the working spaces of the servo motor or are in operative relationship with respective reaction members and are actuable via actuating means by reason of relative movements between the power input member and the power output member.

PRIOR ART

Control valves in prior art types of pressure control systems of the above type have a closed center, i.e., in a neutral position of the control pistons all connections are separated from one another. If the servo piston through outer forces, in the sense of a straight-ahead position of the wheels or via a steering operation, should be moved in the area of the pre-stressed coupling means without servo support, then the pressure must be forced from one working space while pressure must be introduced to the other working space. The forced removal of pressure brings therewith a more or less large amount of a pressure increase which continues to the reaction area of the control piston and moves the control piston so that a connection to the return line is developed. During this time, there develops a pressure reduction in the other working space which leads to the other reaction space. In this manner, the movement or the control piston is supported so that finally a connection from the pressure source to the latter working space is produced. Similar conditions result when two control pistons are employed.

In this process there develops, however, two disadvantages. One disadvantage is noted particularly when the connection to the return line is released earlier due to unsymmetric overlapping of the guiding edges than the connection of the other working space to the pressure source. As mentioned above, there then develops low or negative pressure. If this working space is then connected with the pressure source, the pressure medium, which is under high pressure, is relieved. It is commonly known that such a stress removal results in escape of air. The escape of air results in noise development and an undefined resilience of the system. These undesirable developments appear to a greater extent the lower the pressure. Low or negative pressure should therefore be avoided in any case.

Another undesirable development is that the pressure means, which is under a high amount of pressure, is used for filling a working space which does not require pressure in the respective area of a steering operation. The result is an unnecessary rapid emptying of the hydraulic accumulator which serves for the supplying of the control.

SUMMARY OF THE INVENTION

It is the object of the present invention to prevent the above-discussed disadvantages and to provide a pressure control device of the above-mentioned type which is so constructed and arranged that only the most necessary quantity of pressure medium is removed from the hydraulic reservoir and no negative pressure medium can develop in any one of the working spaces. The object is solved in that in a neutral position the working spaces are mutually connected, in addition to being connected with the return line, and in which a resistance valve is installed in the return line, and a pressure regulating valve which is fed by the pressure source, is connected with the working spaces via one one-way valve which valves open in the direction of the working space, whereby the setting of the pressure regulating valve is lower than the setting of the resistance valve. It is possible, in this manner, to retain always an over-pressure, independent of the size of any leakage flow or overlappings.

The pressure flow through the pressure regulating valve is, however, very low, since it opens only when there exists a pressure reduction. On the whole, the pressure consumption is reduced in that at first an overflow from one working space into the other is occurring. In pressure control devices having two control pistons installed in one valve member transversely and preferably off-center, whereby the valve member cooperates with one connecting element in the manner of a rotary distributor, it has been proven as advantageous, in order to avoid a sealing friction between the valve member and the connecting member, that the resistance valve be located inside the valve member. The pressure medium then reaches the connecting member in a condition which is already stress-relieved and pressureless.

Further objects and advantages of the invention will become more readily apparent from the following detailed description and annexed drawings, and in which drawings:

DETAILED DESCRIPTION OF THE INVENTION

Figure 1:
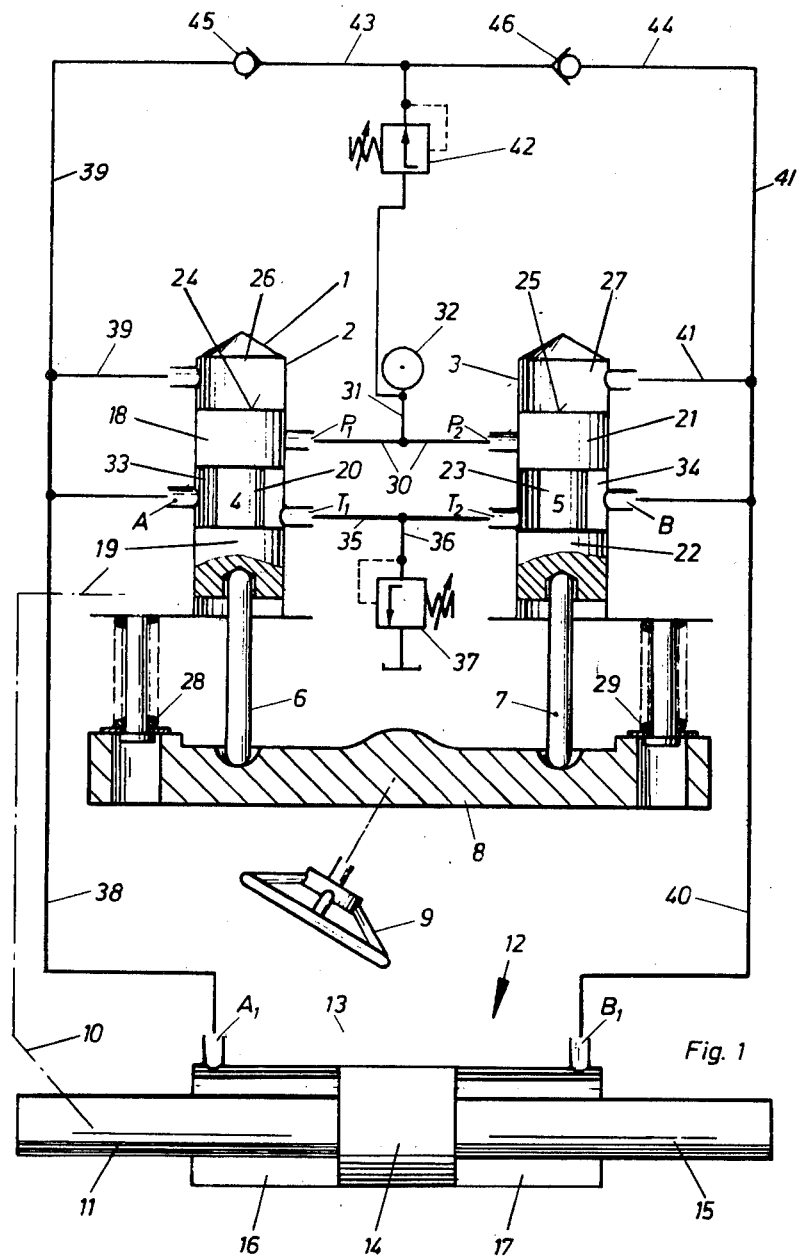
FIG. 1 is a diagrammatic view of a pressure control means embodying the present invention.

As shown in FIG. 1, there are two parallel bores or cylinders 2 and 3 located in a valve member 1 (not shown in detail), and in which bores control pistons 4 and 5 are slidably positioned. The control pistons 4 and 5 are connected with a lever 8 by means of push rods 6 and 7, respectively, with the lever serving as an actuating means and, per se, being in operational relationship with a steering wheel 9 as illustrated by the dot-dash line. The valve member 1 is operably connected with a piston rod 11 of a servo motor 12 as indicated by dot-dash line 10. The servo motor 12 includes a cylinder 13 in which a piston 14 is slidably mounted and one face of the piston 14 has connected thereto the piston rod 11. On the other face of the piston opposite the piston rod 11, a further piston rod 15 is connected to the piston 14. The annular spaces surrounding the piston rods 11 and 15 within the cylinder 13 constitute working spaces or areas 16 and 17, respectively.

The control piston 4 is provided with two shoulders or lands 18 and 19 which are separated by a reduced shank 20. In a like manner, the control piston 5 is provided with two shoulders or lands 21 and 22 which are separated from each other by a reduced shank 23. The front face of the control piston 4, which is located opposite push rod 6, is indicated 24. The respective front face of the control piston 5 is indicated 25. The areas which are between the front faces 24 and 25 and the closed ends of the bores 2 and 3 provide reaction chambers 26 and 27, respectively.

When the lever 8 is in a neutral position, its two ends effect pre-stressed springs 28 and 29 located between the lever and valve member and bear on valve member 1, with such springs serving as resilient coupling means between the lever 8 and constituting a power input member. The valve member 1 functions as a power output member. In this neutral position, the control pistons 4 and 5 are arranged so that they close connections or ports $P_1$ and $P_2$ by means of their shoulders 18 and 21, respectively.

Connections or ports $T_1$ and $T_2$, which are located adjacent the shoulders 19 and 22, lead into annular spaces 33 and 34 surrounding the reduced shanks 20 and 23 at this location. The connections $T_1$ and $T_2$ are interconnected by a pipe or line 35 from which branches a return pipe 36 in which is installed a resistance valve 37. Close to the center between the shoulders 18 and 19, a connection or port A leads to the annular space 33 of the central piston 4 and is connected with connection or port $A_1$ via a pipe or line 38, with the connection $A_1$ communicating with the working space 16 of the servo motor. A pipe or line 39 branches from the pipe 38 and leads to the reaction chamber 26. A connection or port B leads to the annular space 34 of the control pistons at approximately a mid-point between the two shoulders 21 and 22 and communicates with a connection or port $B_1$ via a pipe or line 40 and the port $B_1$ leads into the working space 17 of the servo motor. A pipe or line 41 branches from the pipe 40 and communicates with the rection chamber 27. A pressure regulating valve 42 is provided whereby the pressure regulating valve is supplied from the source 32 and the outlet of the valve 42 is connected with the pipes 39 and 41 by means of pipes or lines 43 and 44 and in which one-way valves 45 and 46 are installed in the pipes 43 and 44, respectively, with the valve 45 opening in the direction of the pipe 39 and the valve 36 in the direction of the pipe 41. The pressure regulating valve 42 is adjusted to a somewhat lower value than the resistance valve 37.

To explain the mode of operation, it is assumed that a pressure source 32 produces a predetermined pressure. This pressure communicates with the ports $P_1$ and $P_2$ via pipes 31 and 30. Since the shoulders or lands 18 and 21 are adapted, with a certain amount of play, to slide in the bores 2 and 3, there will result a leakage flow through the gap. This leakage flow spreads on the one hand into the working spaces 16 and 17, and on the other hand to the resistance valve 37 via pipes 35 and 36. As soon as a predetermined low pressure is realized in the entire system, the valve 37 opens so that the pressure is limited to a predetermined value during a further flow of the leakage fluid. It should further be assumed that the steering wheel 9 provides the lever 8 with a movement in a clockwise direction. This steering resistance on the steerable wheels should at first be still so low that a steering operation via the pre-stressed springs 28 or 29 can ensue. The movement of the lever 8 is then transmitted, without a development of a relative movement between the lever 8 and the valve member 1, to the same. The valve member 1 guides the movement, as indicated by the line 10 to the piston rod 11 of the servo motor. The piston rod 11, together with the piston 14, thus moves to the right, and this means that the working space 17 is being reduced and fluid from the space 17 is forced to the port B of the bore 3 via port $B_1$ and the pipe 40. The pressure medium then reaches the pipe 38 and the working space 16 via the annular space 34, the port $T_2$, the pipe 35, the port $T_1$, the annular space 33 and the port A. This means that as long as no relative movement results between the power input member 8 and the power output member 1, an overflow of the pressure medium from one working space into the other cannot take place, whereby an outflow through the return flow pipe via the valve 37 is prevented. In spite of an enlargement of the working space 16, the development of an under pressure is thus prevented. If, at increasing steering resistances, finally the pre-stressing of the spring 28 is overcome, a relative movement takes place between the lever 8 and the valve member 1. The result thereof is that the control piston 4 is pushed further into the bore 2 by the push rod 6 so that at first an overflow possibility is retained. However, finally, the port $T_1$ is completely blocked by the shoulder 19. At this time, the control piston 5 executes a movement in the opposite direction in the bore 3. This means that at this location, a connection between the ports B and $T_2$ will still remain. If the control piston 4 is provided with a so-called zero-overlapping, then the connection or port $P_1$ will become open at once after the closing of the port $T_1$, whereby pressure can flow from this port to the port A. In a commonly retained small positive overlapping, a small pressure reduction in the working space 16 of the servo motor will take place before pressure is again supplied from the port $P_1$. Since this pressure reduction, however, results from an overpressure, the development of an under-pressure is prevented.

A very safe but a little uneconomical mode for retaining an over-pressure resides in that according to FIG. 1, a pressure regulating valve 42 is provided whereby the pressure regulating valve is supplied from the source 32 and the outlet of the valve 42 is connected with the pipes 39 and 41 by means of pipes or lines 43 and 44 and in which one-way valves 45 and 46 are installed in the pipes 43 and 44, respectively, with the valve 45 opening in the direction of the pipe 39 and the valve 36 in the direction of the pipe 41. The valve 42 is adjusted to a somewhat lower value than the valve 37. Insofar as a respective pressure is present in the working spaces 16 and 17 of the servo motor 12 and hence also in the pipes 39 and 41, the valve 42 remains closed, since the pressure which is produced thereby is insufficient to open the one-way valves 45 and 46. The valve 42 functions only when there develops a substantial pressure reduction in one of the pipes 39 or 41. For example, such pressure reduction could develop if there existed a very large positive overlapping in one of the control pistons 4 and 5 so that a certain time would lapse between the closing of the port $T_1$ or $T_2$ and the opening of the port $P_1$ or $P_2$.

It should be mentioned that the above-described overflow of the pressure medium takes place also at a time when the servo piston 14 is moved by outer forces. This movement occurs always in a case in which the steerable wheels by themselves move into a straight ahead position. It should further be pointed out that the pre-stressed springs 28 and 29 are merely illustrative of any one of suitable pre-stressed coupling means. It is also feasible to utilize coupling means which are not pre-stressed such as, for example, torsion rods.

Figure 2:
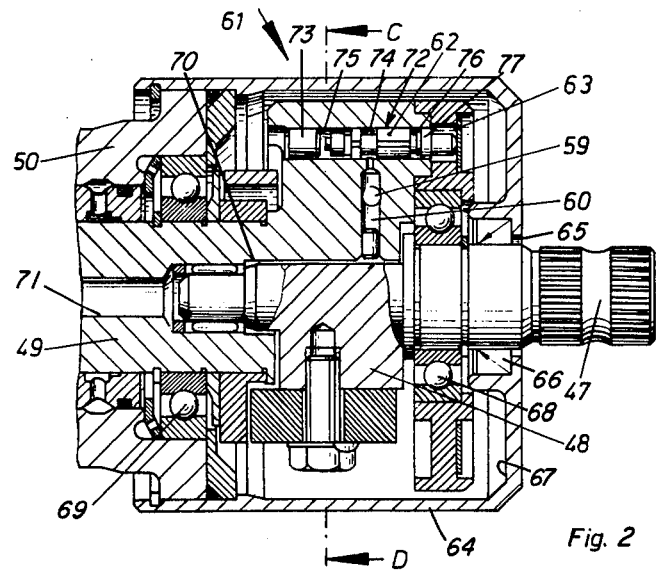
FIG. 2 is a longitudinal sectional view with certain parts in elevation, of a pressure control means in the nature of a rotary distributor located parallel to the control piston.

Referring to FIG. 2, there is shown a power input member 47 which is connectable with a steering wheel (not illustrated) in detail. A dual cited lever 48 is attached to the power input member 47 and serves as an actuating means. The power input member 47 is positioned in a valve member 49, by means of rolling bearings the valve member 49 per se cooperates with a connecting member 50 (only partially shown) in the form of a rotary switch unit or dustributor. The lever 48, as shown in FIG. 4, affects control pistons 53 and 54 by means of push rods 51 and 52, with the control pistons being slidably arranged in bores 55 and 56 of the valve member 49 transverse and off-center to the axis of the control member. The control pistons 53 and 54, in contrast to the control pistons 4 and 5, are provided with three shoulders. It will be noted that in the neutral position of the control pistons 53 and 54 respectively first releases a connection between the ports A and $T_1$ or B and $T_2$.

Insofar as a respective pressure is present in the working spaces 16 and 17 of the servo-motor and hence also in the pipes 39 and 41, the pressure-regulating valve 42 remains closed, since the pressure which is reduced thereby is insufficient to open the one-way valves 45 and 46. The valve 42 functions only when there develops a substantial pressure reduction in one of the pipes 39 and 41. For example, such pressure reduction could develop if there existed a very large positive overlapping in one of the control pistons 4 and 5 so that a certain time would lapse between the closing of ports $T_1$ or $T_2$ and the opening of the ports $P_1$ or $P_2$.

It should further be pointed out that the prestressed springs 28 and 29 are merely illustrative of any one of suitable prestressed coupling means. It is also feasible to utilize coupling means which are not prestressed, such as, for example, torsion rods.

The ports A and B in the area of the shoulder 57 and 58 open into bores 55 and 56, while ports $T_1$ and $T_2$ open at least partially in the areas of reduced shanks 57' and 58' arranged between the shoulders 57 or 58 and shoulders 57'' and 58''. The ports $P_1$ and $P_2$ are connected with each other in a manner not shown in detail and opening in the area of reduced shanks 57''' and 58''', which also are adjacent the shoulders 57 and 58.

The ports $T_1$ and $T_2$ are connected with each other within the valve member 49 by means of a connecting bore 59, as shown in FIG. 2. A further bore 60 branches from the bore 59, as shown in FIG. 2. A further bore 60 branches from the bore 59 and leads to a resistance valve 61, with the valve 61 being provided with a piston 62. The piston 62 is stressed at one front portion by a plate spring 63 and the plate spring is fastened onto the valve member 49. The section of the valve member 49 containing the control pistons 53 and 54 is surrounded by a pot-shaped cover 64, with a clearance and the cover is fastened on the valve member 49 to seal against fluid leakages.

The cover is provided with an entrance 65 for the power input member 47, and the entrance is sealed by a sealing member 68. A free space 67 within the cover 64 is connected with a channel 71 via bearings 68 and 69 as well as a gap 70 between the power input member 47, and the valve member 49. The channel 71 is connected with a discharge connection in the connecting member 50 by means of additional channels and annular T-slots (not shown).

The piston 62 slides in a bore 72 which is sealed at one side by means of a plug 73. The further bore 60 opens in the area of an annular T-slot or groove 74 in the piston 62, with the piston being connected with a space 75 between the plug 73 and control piston 72 and with a further annular T-slot or groove 76. The annular T-slot 76 is separated from the space 67 by means of a shoulder 77 when piston 62 is in a neutral position.

It should be further noted that the valve member 49 is the operational connection with the steering wheels and the servo motor. The working areas of the servo motor are controlled by means of the control pistons 53 and 54, which will be described closer hereinbelow. Between the power input member 47 and the valve member 49 is arranged an annular spring element which serves as a resilient coupling means, such as, for example, disclosed in German patent application Nos. P 22 42 020.8 (published Feb. 28, 1974) and P 22 56 073.2 (published May 22, 1974). The mode of operation of such a spring element per se is also disclosed in U.S. Pat. No. 3,170,535.

Figure 3:
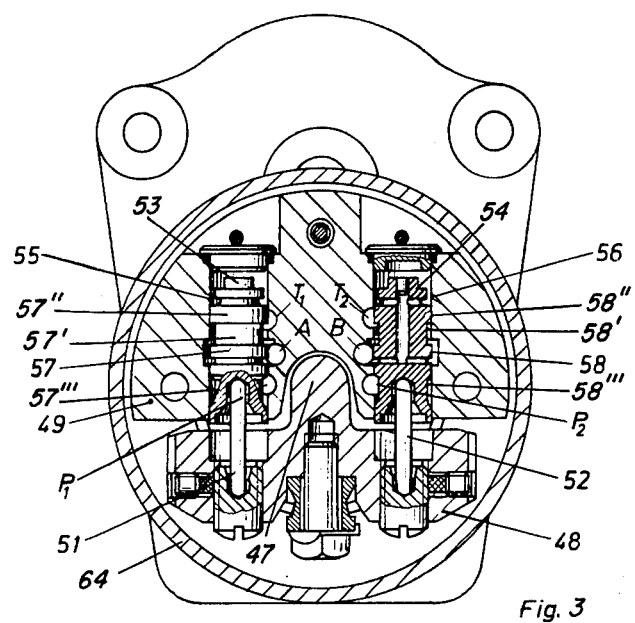
FIG. 3 is a view taken along the line C-D of FIG. 2 the view looking in the direction of the arrows.

For the purpose of explaining the manner of operation may it be assumed that the servo motor 12 and the pressure-regulating valve 12 of FIG. 1 are connected to the ports A and B of FIG. 3 via pipes 38 and 40, and 43 and 44, respectively. It may further be assumed that pressure exists on ports $P_1$ and $P_2$. Due to this pressure, a mold leakage will develop from port $P_2$ to port A or from port $P_2$ to port B. Since port A at first is connected with port $T_1$ by means of the reduced shank 57' and port B is connected via the reduced shank 58' with the port $T_2$, a pressure increase will be caused, due to the leakage up into the ports $T_1$ and $T_2$ and will continue into the connecting bore 59 since the two ports $T_1$ and $T_2$ are connected with each other, and will extend from there via the bore 60 to the annular slot 74 of the piston 62.

The pressure flows from there into space 75 and stresses the piston 62 at its frontal area against the force of the plate-spring 63. When the pressure reaches a height of, for example, 5 bar, the piston 62 is pushed against the force of the plate spring 63 until finally the annular T-slot or groove 76 comes into communication with the free space 67, which will cause an amount of pressure, corresponding to the leakage, to flow into space 67 and from there into the tank-connection (now shown in detail). The pressure of 5 bar does, of course, also exist on ports A and B as well as in operating spaces 16 and 17 of the servo motor 12. The one-way valves 45 and 46 are closed, because the reduced pressure downstream the pressure regulating valve 42 is lower than 5 bar.

It may now further be assumed that the power input member 47 is moved clockwise and that the steering-resistance is so low that the required momentum could be transmitted, by means of the spring element, from the power input member 47 to the valve member 49. This will means that firstly there will not take place a relative movement between the power input member 47 and the valve member 49. The piston 14 of the servo motor will thereby move to the right, the working (or operating) space will be reduced and forces pressure via port B to port $T_2$ and from there via the connecting bore 59 and port $T_1$ to port A and from there into the enlarging working space 16. This will guarantee that no underpressure will develop in the working space 16.

The identical process occurs when, for example, by means of outside forces, the piston 14 is moved to the right. If the force, which is required for steering, is increased, then the initial stress of the spring element is overcome and a relative movement takes place between the lever 43 and valve member 49. The control piston 53 is thereby displaced in a manner so that the shoulder 57 gradually closed the connection $A-T_1$, and then can open the connection $P_1-A_1$ after a minor positive overlap, so that pressure is able to flow from port $P_1$ to port A in the sense of a servo support, and from there into the working space 16. The control piston 54, during this process, will have performed a movement in the opposite direction so that the port B will still be connected with the port $T_2$. The connection of working spaces 16 and 17 thus is actually only interrupted when the shoulder 57 has blocked the connection $A-T_1$ completely. Nevertheless, a pressure reduction in the working space 16, possibly caused by small positive overlapping, does not take place by reason of the pressure-regulating valve 42. Since the pressure flowing from the working space 17 must also always pass the resistance valve 61, there will be retained the low original overpressure in the working space 17. A counter-clockwise movement of the power input member 47 would produce the identical processes respectively, for the other control pistons or the other working spaces.

The present invention is not to be restricted to the embodiments illustrated and it is particularly possible to apply the invention to pressure control means having only one single control piston.

What is claimed is:

1. A pressure control means for vehicles having steerable wheels and a steering wheel for the wheels, including a control valve having a four-way control, at least two cylinders and two control pistons located in the cylinders, a pressure source, a return line to a reservoir, a servo motor provided with a cylinder member, a piston member and working space on each side of the piston member, said control pistons serving to selectively connect the working spaces of the servo motor with the pressure source or return line, said valve constituting a power-output member and operably connected to one of the members of the servo motor, with said one member of the servo motor being operably coupled with the steerable wheels, an actuating member for the control pistons movable relative to the valve and constituting a power input member, means operably connecting the actuating member to the steering wheel, coupling means connecting the input and output members, said control pistons and cylinders coacting to provide reaction chambers stressed by the pressures of the working spaces of the servo motor, first means providing communication between one of said cylinders and one working space of the servo motor, second means providing communication between the other of said cylinders and the other working space of the servo motor, third means providing communication between the cylinders, the return line being in communication with the third means, fourth means providing communication between the pressure source and the cylinders, and the first and second means having branches leading to the accompanying reaction chambers, when the actuating member is in a neutral position, the working spaces of the servo motor are in communication with each other and the return line via the first means, the cylinder and the second means and the third means, respecitvely, and a resistance valve located in the return line, the improvement being that a pressure regulating valve having an inlet connected to said pressure source and an outlet connected to the working spaces of the servo motor, and one-way valve means located between the outlet and working spaces, the one-way valve means opening in the direction of the working spaces, with the setting of the pressure regulating valve being lower than the setting of the resistance valve.

2. The pressure control means as claimed in claim 1, said control pistons being mounted transversely and off-center in the valve, a connecting member in the form of a rotary distributor, and the resistance valve being located in the valve.

* * * * *